US011099741B1

(12) United States Patent
LeCrone et al.

(10) Patent No.: US 11,099,741 B1
(45) Date of Patent: Aug. 24, 2021

(54) PARALLEL ACCESS VOLUME I/O PROCESSING WITH INTELLIGENT ALIAS SELECTION ACROSS LOGICAL CONTROL UNITS

(71) Applicant: EMC IP Holding Company LLC, Hopkinton, MA (US)

(72) Inventors: Douglas Eric LeCrone, Hopkinton, MA (US); Paul Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 61 days.

(21) Appl. No.: 15/799,070

(22) Filed: Oct. 31, 2017

(51) Int. Cl.
*G06F 3/06* (2006.01)

(52) U.S. Cl.
CPC .......... *G06F 3/0613* (2013.01); *G06F 3/0665* (2013.01); *G06F 3/0689* (2013.01)

(58) Field of Classification Search
CPC ..... G06F 3/0613; G06F 3/0665; G06F 3/0689
See application file for complete search history.

(56) References Cited

U.S. PATENT DOCUMENTS

| 5,530,845 | A | * | 6/1996 | Hiatt | G06F 13/105 |
| | | | | | 703/27 |
| 6,185,638 | B1 | * | 2/2001 | Beardsley | G06F 13/387 |
| | | | | | 710/3 |
| 6,622,177 | B1 | * | 9/2003 | Eilert | G06F 13/387 |
| | | | | | 709/249 |
| 6,665,739 | B2 | | 12/2003 | Vishlitzky et al. | |
| 8,214,585 | B2 | | 7/2012 | Schreiber et al. | |
| 9,170,904 | B1 | | 10/2015 | LeCrone et al. | |
| 9,645,747 | B2 | | 5/2017 | Candelaria et al. | |
| 9,665,502 | B1 | | 5/2017 | Jones et al. | |
| 2003/0204773 | A1 | * | 10/2003 | Petersen | G06F 11/2069 |
| | | | | | 714/6.31 |
| 2005/0149929 | A1 | * | 7/2005 | Srinivasan | G06F 11/3423 |
| | | | | | 718/100 |
| 2009/0049235 | A1 | * | 2/2009 | Schreiber | G06F 3/0613 |
| | | | | | 711/112 |
| 2010/0161853 | A1 | * | 6/2010 | Curran | G06F 13/385 |
| | | | | | 710/39 |
| 2011/0138194 | A1 | * | 6/2011 | Godwin | H04L 9/00 |
| | | | | | 713/190 |
| 2014/0181804 | A1 | * | 6/2014 | Sakata | G06F 9/455 |
| | | | | | 718/1 |

(Continued)

OTHER PUBLICATIONS

U.S. Appl. No. 14/674,617, "I/O Optimization", filed Mar. 31, 2015.

(Continued)

*Primary Examiner* — Andrew J Cheong
(74) *Attorney, Agent, or Firm* — Ryan, Mason & Lewis, LLP

(57) ABSTRACT

Techniques are provided for assigning alias devices in a parallel access volume storage environment. An exemplary method for assigning alias devices by a host in a parallel access volume storage environment comprises: obtaining a next I/O (input/output) operation from a queue; obtaining a utilization factor for a plurality of available I/O processing thread in the storage controller; and assigning the next I/O operation to an alias device associated with a given one of the plurality of available I/O processing threads based on the utilization factors.

20 Claims, 8 Drawing Sheets

(56) References Cited

U.S. PATENT DOCUMENTS

| | | | | |
|---|---|---|---|---|
| 2015/0169341 A1* | 6/2015 | Gulati | ................ | G06F 9/45533 |
| | | | | 718/1 |
| 2015/0293830 A1* | 10/2015 | Bhide | ................... | G06F 3/0653 |
| | | | | 718/1 |
| 2018/0120920 A1* | 5/2018 | Iyigun | ................... | G06F 1/3203 |
| 2018/0203803 A1* | 7/2018 | Compton | ............. | G06F 9/5077 |

OTHER PUBLICATIONS

Cronin, C., "IBM System z10 I/O and High Performance Ficon for System z Channel Performance", Technical paper, IBM Corp., 33 pp., Jan. 28, 2009.

"ZBoostTM PAV Optimizer", EMC Corporation, Aug. 20, 2015.

"Parallel Access Volumes (PAV) and HyperPAV" downloaded from https://www.ibm.com/support/knowledgecenter/SSB27U_6.2.0/com.ibm.zvm.v620.hcpb8/pay.htm on Sep. 4, 2017.

"Using SuperPAV mode", IBM Knowledge Center, downloaded from https://www.ibm.com/support/knowledgecenter/en/SSLTBW_2.3.0/com.ibm.zos.v2r3.ieag/800superpay.htm on Oct. 4, 2017.

"SuperPAV Dynamic alias management", IBM Knowledge Center, downloaded from https://www.ibm.com/support/knowledgecenter/en/SSLTBW_2.3.0/com.ibm.zos.v2r3.e0za100/v2r3_ios_superpav.htm on Oct. 4, 2017.

* cited by examiner

PARALLEL ACCESS VOLUME I/O PROCESSING WITH INTELLIGENT ALIAS SELECTION ACROSS LOGICAL CONTROL UNITS

FIELD

The field relates generally to the management of computing devices, and more particularly, to the management of alias devices in a computing environment to improve processing of I/O requests.

BACKGROUND

Parallel Access Volumes (PAVs) allow multiple concurrent I/O (input/output) requests to be processed by a single device. A PAV comprises a logical base device and one or more associated logical alias devices. The logical devices are represented using unit control blocks (UCBs). An I/O request to a PAV identifies a base UCB, and the base UCB or an associated alias UCB then processes the request, depending on availability.

A HyperPAV architecture employs a set of logical control units (LCUs), each comprising base devices and alias devices. Within an LCU, an alias device can be used for I/O requests to any base device within the LCU. A SuperPAV architecture also employs a set of LCUs, but an alias device of a first LCU can be used for I/O requests to a base device in a second LCU, when the second LCU does not have an available alias device in its alias device pool.

A need remains for improved techniques for assigning I/O requests to alias devices in a PAV storage environment.

SUMMARY

In one embodiment, a method is provided for assigning alias devices in a PAV storage environment. An exemplary method for assigning alias devices by a host in a parallel access volume storage environment comprises: obtaining a next I/O operation from a queue; obtaining a utilization factor for a plurality of available I/O processing thread in the storage controller; and assigning the next I/O operation to an alias device associated with a given one of the plurality of available I/O processing threads based on the utilization factors.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for assigning alias devices in a PAV storage environment.

In one or more embodiments, alias devices are assigned across LCUs in a parallel access volume storage environment based on a utilization of the various I/O executors (also referred to as I/O processing threads). An I/O operation is obtained from a queue, and assigned to an alias device associated with a given I/O executor based on a utilization of the available I/O executors.

Figure 1:
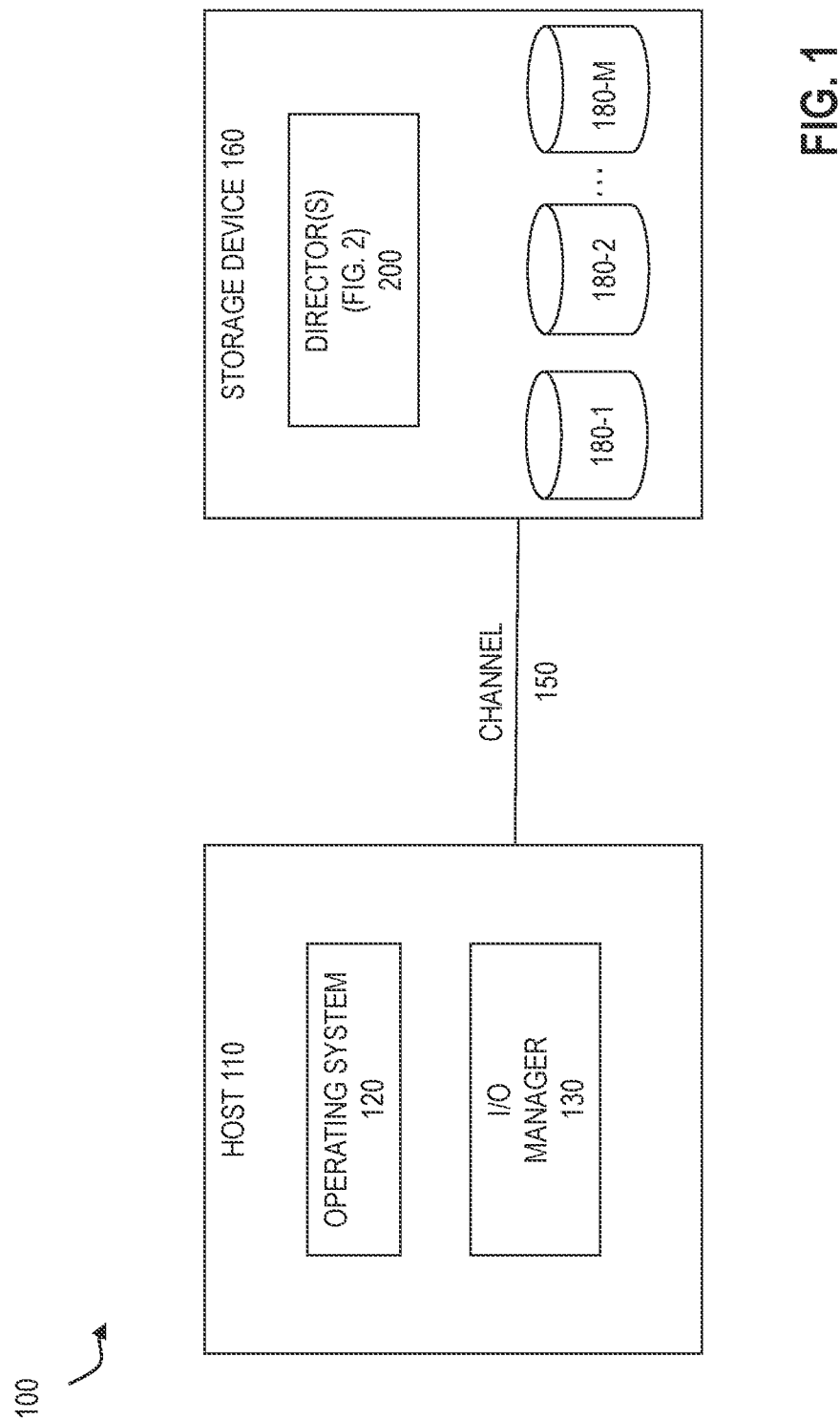
FIG. 1 illustrates a storage system comprising a host and a storage device that communicate over a channel, according to one embodiment of the disclosure.

FIG. 1 illustrates a storage system 100 comprising a host 110 and a storage device 160 that communicate over a channel 150, according to one embodiment of the disclosure. The storage device 160 may be implemented, for example, as a Symmetrix storage system commercially available from Dell EMC Corporation of Hopkinton, Mass.; or other appropriate types of storage devices. While only one host 110 and one storage device 160 are shown in FIG. 1, the storage system 100 may comprise additional hosts and/or storage devices that may or may not be similar to host 110 or storage device 160, respectively, as would be apparent to a person of ordinary skill in the art. The channel 150 may be implemented, for example, as a FICON connection (Fiber Connection) between host 110 and storage device 160, such as a Fiber Channel-Single Byte Command Code Sets-6 (FC-SB-6) channel.

As shown in FIG. 1, host 110 comprises an operating system 120 and an I/O manager 130. The operating system 120 may be implemented, for example, as a Linux, z/OS or another appropriate operating system (OS). The I/O manager 130 may comprise a FICON connection controller in the illustrative embodiment for providing the FICON channel 150 between host 110 and storage device 160. The FICON connection controller may act as an I/O subsystem providing FICON communication capability. Host 110 reads and writes data from and to the storage device 160 using, for example, a host adapter, that facilitates an interface between the host 110 and the storage device 160. For a discussion of features and implementations of FICON systems and suitable Fiber channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

The I/O processing on the host 110 may operate with the FICON connection controller within the I/O manager 130 to enable I/O operations with the storage device 160. The FICON connection controller may send and receive data to and from the storage device 160 using a remote connection mechanism, which may include a network (such as the Internet, and appropriate connection thereof). The I/O manager 130 further comprises the functionality to implement the disclosed techniques for assigning alias devices across LCUs in the parallel access volume storage environment based on a utilization of the various I/O executors.

As shown in FIG. 1, storage device 160 includes one or more directors 200, as discussed further below in conjunction with FIG. 2. Generally, the directors 200 may be implemented as one or more of host adapters, remote adapters and disk interface units (disk adapters). Storage device 160 may also comprise a plurality of host interface units (I/O modules). Host 110 accesses the storage device through a plurality of channels provided therewith. Host 110 provides data and access control information through the channels to the storage device 160 and the storage device 160 provides data to host 110 also through the channels. Host 110 does not address the disk drives of the storage device directly, but rather, accesses what appears to host 110 as a plurality of logical disk units. The logical disk units may or may not correspond to the actual disk drives. Allowing multiple host systems to access the single storage device unit allows the host systems to share data stored therein.

As shown in FIG. 1, storage device 160 also includes one or more disks 180-1 through 180-M (including solid state storage), each containing a different portion of data stored on each storage device 160. Storage device 160 (and/or remote storage devices, not shown) may be provided as a stand-alone device coupled to the host 110 as shown in FIG. 1 or, alternatively, the storage device 160 (and/or remote storage devices) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

The storage space in the storage device 160 that corresponds to the disks 180-1-180-M may be subdivided into a plurality of volumes or logical devices. The logical devices may or may not correspond to the physical storage space of the disks 180. Thus, for example, the disk 180-1 may contain a plurality of logical devices or, alternatively, a single logical device could span both of the disks 180-2 through 180-M. Similarly, the storage space for a remote storage device may be subdivided into a plurality of volumes or logical devices, where each of the logical devices may or may not correspond to one or more disks of the remote storage device.

In some embodiments, one or more of the directors 200 may have multiple processor systems thereon and thus may be able to perform functions for multiple directors. In some embodiments, at least one of the directors 200 having multiple processor systems thereon may simultaneously perform the functions of at least two different types of directors (e.g., a host adapter and a disk adapter). Furthermore, in some embodiments, at least one of the directors 200 having multiple processor systems thereon may simultaneously perform the functions of at least one type of director and perform other processing with the other processing system. In addition, all or at least part of a global memory of the storage device may be provided on one or more of the directors 200 and shared with other ones of the directors 200. In an embodiment, the features discussed in connection with the storage device 160 may be provided as one or more director boards having CPUs, memory (e.g., DRAM, etc.) and interfaces with Input/Output (I/O) modules.

The storage device 160 may include physical storage volumes and/or logical volumes, such as the Symmetrix data storage facility from Dell EMC. The storage device 160 may include features and/or components enabling the Fiber channel communication with the host 110.

It is noted that various components of the storage system 100 may be emulated. For further discussion of emulation of I/O computing components, and particularly Fiber Channel connection components, reference is made to U.S. Pat. No. 9,665,502, to Jones et al., entitled "Virtual I/O Hardware" and U.S. Pat. No. 9,170,904, to LeCrone et al., entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The channel 150 may include an Internet connection and/or possibly some other types of connection(s). In an embodiment herein, the channel 150 may be directly incompatible with a FICON connection. The incompatibility may be hardware incompatibility, software incompatibility, or both. Such channel 150 may not support a direct FICON connection but, instead, rely on a FICON emulator (and/or other emulator(s)) for providing data in an appropriate format. It is further noted that where FICON emulation is being performed, the storage device 160 may include or be coupled to a FICON emulator portion that may send and receive data to and from the channel 150 and also emulates a Fiber Channel FC0 physical layer for the benefit of the storage device 160. Thus, in such case involving emulation, both the host 110 and the storage device 160 may operate as if the devices 110, 160 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol.

zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF-capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 2:
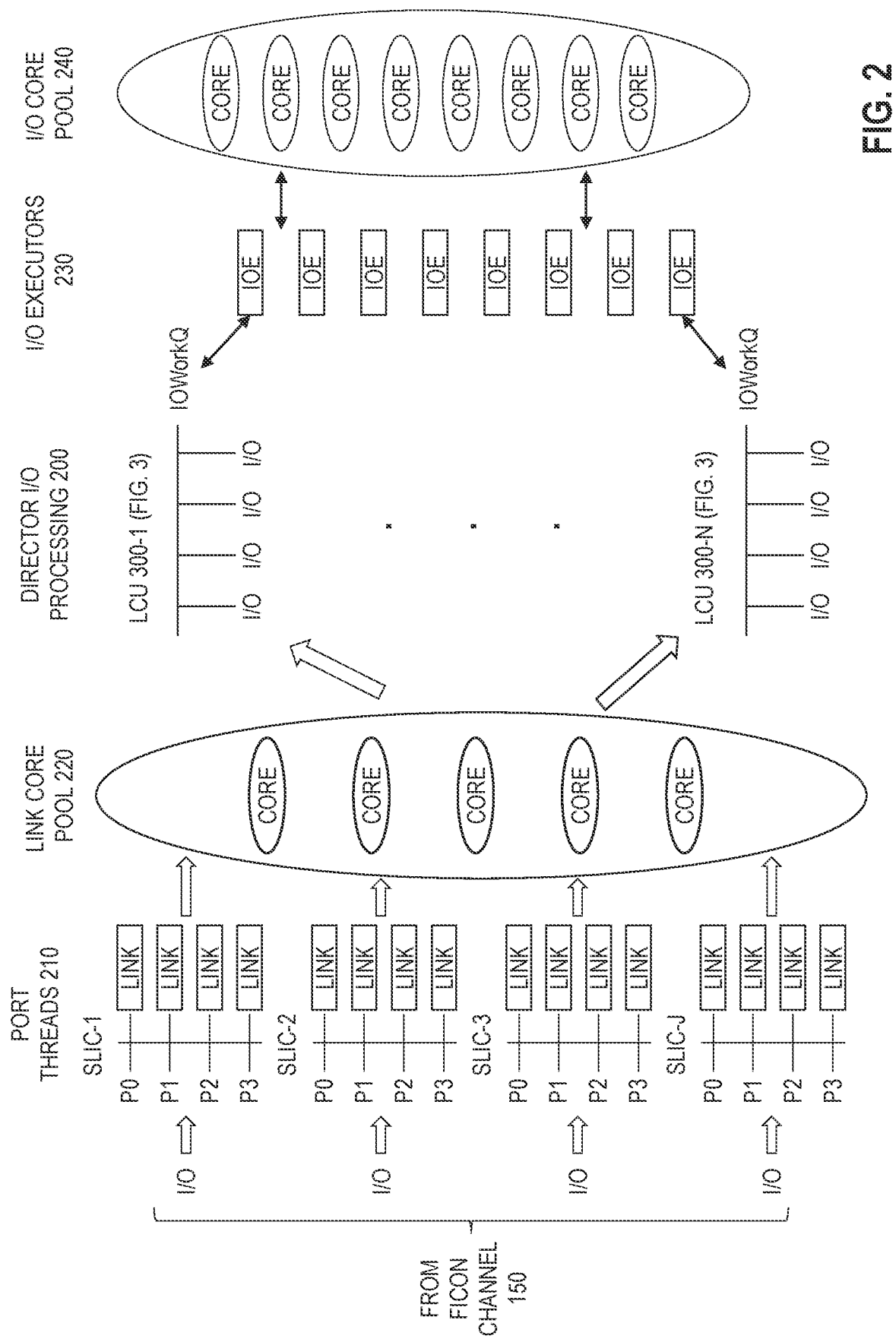
FIG. 2 illustrates an exemplary director of FIG. 1, in further detail, according to an embodiment of the disclosure.

FIG. 2 illustrates an exemplary director 200 of FIG. 1, in further detail, according to one embodiment of the disclosure. As shown in FIG. 2, in one or more embodiments, the exemplary director 200 receives I/O requests from the FICON channel 150, by means of a plurality of port threads, e.g., threads P0-P3, associated with each of a plurality of Small I/O Cards (SLIC) SLIC-1 through SLIC-J (where J is equal to 4 in the embodiment of FIG. 2).

Each port thread of the SLICs run on one or more link cores dynamically assigned from a link core pool 220. The plurality of links comprise the front end of the FICON channel and handle the FICON channel protocol (e.g., FC-SB-6, in the illustrative embodiment). The link core pool 220 executes the port threads (e.g., provided by link emulation). The link core pool 220 may itself receive an allocation of cores from a larger pool of cores.

The link cores provide the I/O requests to a logical control unit 300-1 through 300-N, as discussed further below in conjunction with FIG. 3. The I/O requests are queued within each LCU 300 in a corresponding I/O work queue (IOworkQ). Each LCU is assigned to a given I/O executor (IOE) 230 dynamically assigned from an I/O core pool 240. The I/O core pool 240 executes the I/O executors 230 (e.g., provided by link emulation). The I/O core pool 240 may itself receive an allocation of cores from a larger pool of cores.

In one embodiment, each I/O work queue will have a dedicated I/O executor thread to execute the I/O requests. The I/O Executors (IOE) can run on any core in the I/O core pool 240. In some embodiments, the number of cores in I/O core pool 240 is the remainder of a larger core pool after partitioning out the Link Core Pool 220.

As shown in FIG. 2, as I/O requests enter the director 200, they are directed to different I/O Work Queues (IOworkQ) of different LCUs 300. For example, each LCU 300 can be assigned to one and only one IOworkQ. In addition, in at least some embodiments, there is a one to one relationship between an IOworkQ and an I/O Executor 230. The I/O Executor 230 is responsible for executing the I/O requests on its assigned IOworkQ through the life of the I/O. An IOE 230 will support more than one LCU 300, if multiple LCUs 300 are mapped into a specific IOworkQ.

In one or more embodiments, I/O requests are partitioned based on the LCUs 300. I/O requests for a given LCU 300 is performed by a given I/O executor 230 (while a given I/O executor 230 can have multiple LCUs 300 assigned to it). In one embodiment, the LCUs 300 are striped across the available I/O executors 230 sequentially.

Figure 3:
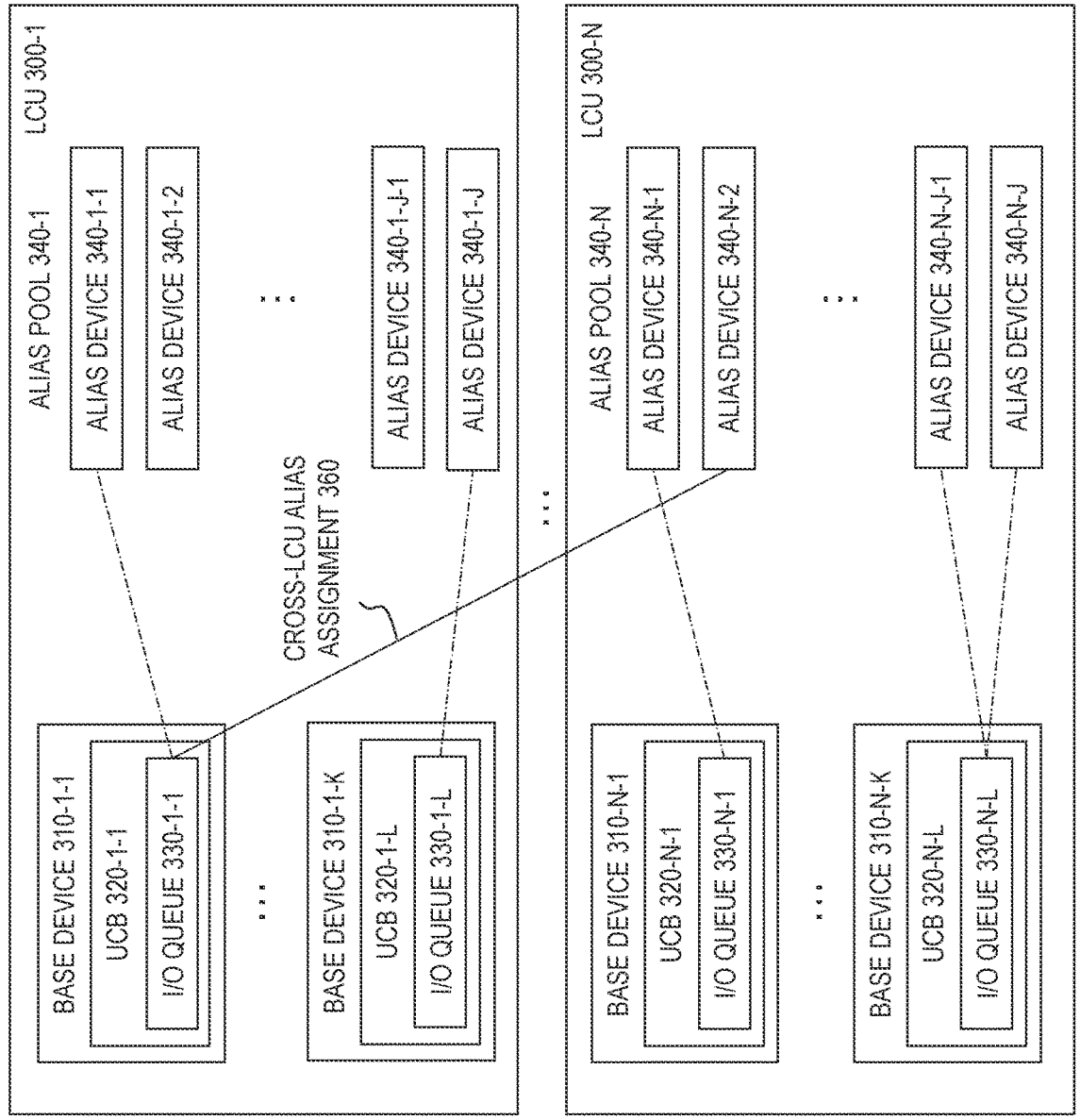
FIG. 3 illustrates a host view of exemplary LCUs of FIG. 2, in further detail, according to some embodiments of the disclosure.

FIG. 3 illustrates a host view of exemplary logical control units 300-1 through 300-N of FIG. 2, in further detail, according to an embodiment of the disclosure. As shown in FIG. 3, a given LCU 300, such as LCU 300-1, comprises a plurality of base devices 310-1-1 through 310-1-K and a plurality of alias devices 340-1-1 through 340-1-J from an alias pool 340-1 of the given LCU 300-1.

A given base device 310, such as base device 310-1-1 comprises a unit control block (UCB) 320-1-1, which represents logical storage devices. Each UCB 320 has a corresponding I/O Queue 330-1-1. On the host side, I/O requests are queued in an I/O Queue 330, processed sequentially from the I/O Queue 330, and assigned to a base device 310 within the same LCU 300, if available, or to an alias device 340-i from the corresponding alias pool 340. For example, in one embodiment, a given LCU 300 may have a pool of 256 devices that may be allocated between the base devices aliases, such as 128 base devices and 128 alias devices.

As noted above, according to one aspect of the present disclosure, alias devices are assigned across LCUs using a cross-LCU alias assignment 360, in a parallel access volume storage environment based on a utilization of the various I/O executors 230 of FIG. 2. An I/O operation is obtained from an I/O queue 320, and assigned to an alias device 340 associated with a given I/O executor based on a utilization of the available I/O executors. Once an I/O request is assigned from a given I/O queue 330 of a given LCU to an alias device 340 of a second LCU 300, using the cross-LCU alias assignment 360, the I/O processing continues in the manner described above. In particular, the I/O executor 230 associated with the second LCU 300 will responsible for executing the I/O request through the life of the I/O.

One or more embodiments of the arrangements of LCUs 300 in FIG. 3 are based on the IBM SuperPAV architecture, as modified herein to provide intelligent alias selection based on utilization of the I/O executors 230. See, for example, IBM DS8880 Product Guide (Release 8.3), IBM Redbooks edition, https://www.redbooks.ibm.com/redpapers/pdfs/redp5344.pdf, and/or OA49139: NEW FUNCTION—SUPERPAV SUPPORT, http://www-01.ibm.com/support/docview.wss?uid=isg1OA49139, each incorporated by reference herein in their entirety. Alias selection techniques according to various embodiments of the present disclosure are discussed further below in conjunction with FIGS. 4-6.

In some Superpav embodiments, each LCU 300 has an alias management group (AMG). Generally, an AMG restricts the LCUs 300 that can be used for cross-LCU alias assignments 360 (FIG. 3). For example, assume that a controller has 50 LCUs 300 and the LCUs 300 are classified into two AMGs: 0 and 1, with 25 LCUs in AMG 0 and the other 25 LCUs in AMG 1. An LCU 300 in AMG 0 cannot borrow an alias device 340 from an LCU 300 in AMG 1. An LCU 300 in AMG 0 can only borrow an alias device 340 from an LCU 300 that is also in AMG 0.

Figure 4:
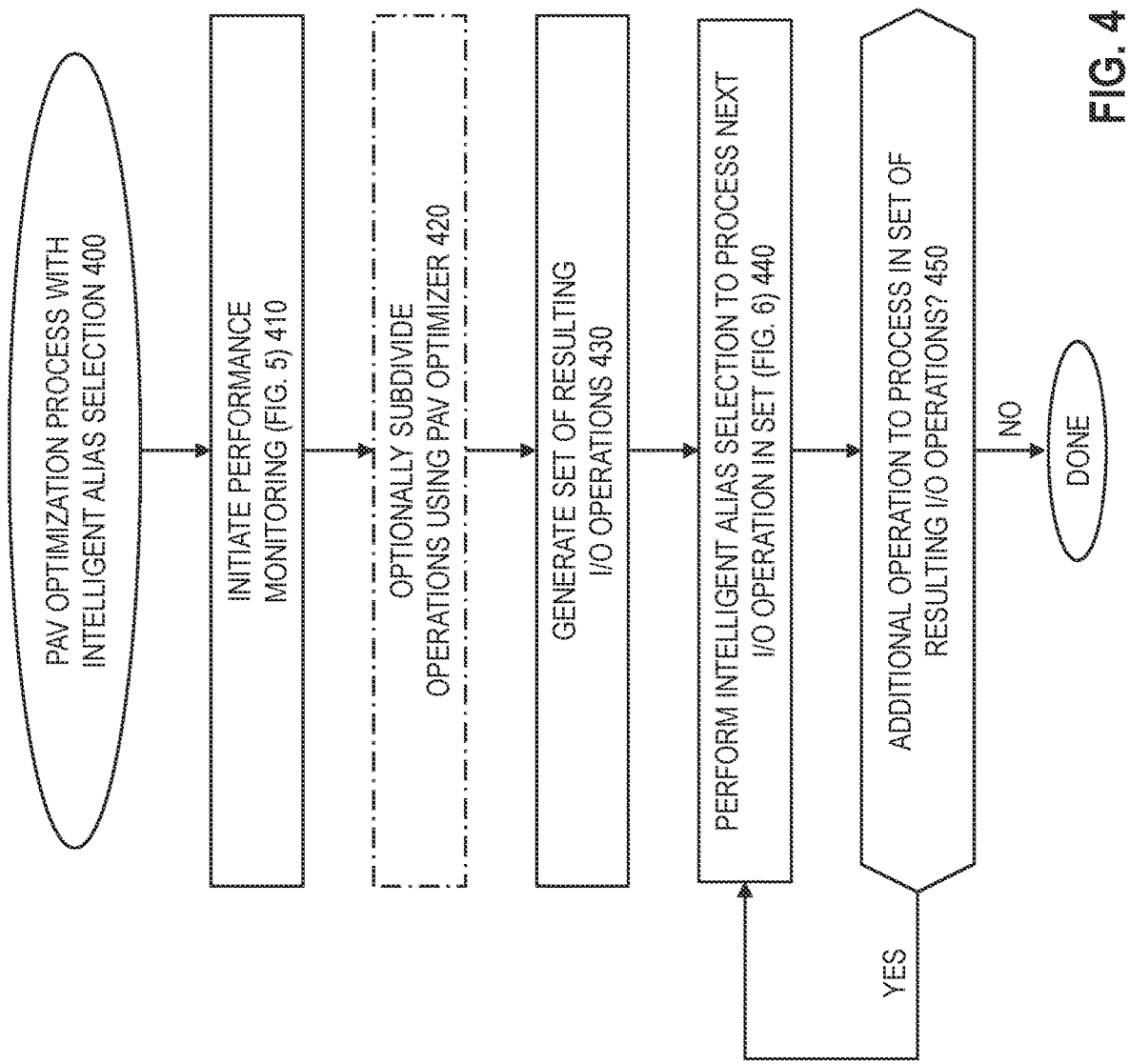
FIG. 4 is a flow chart illustrating an exemplary implementation of a PAV Optimization Process with Intelligent Alias Selection, according to one embodiment of the disclosure.

FIG. 4 is a flow chart illustrating an exemplary implementation of a PAV Optimization Process with Intelligent Alias Selection 400, according to one embodiment of the disclosure. As shown in FIG. 4, the exemplary process 400 initiates a performance monitoring process 500, as discussed further below in conjunction with FIG. 5, during step 410, to monitor the performance of the I/O processing. For example, initiating the performance monitoring process 500 can trigger a monitor mode, where performance statistics are collected and performance metrics are calculated.

During step 420, I/O operations are optionally subdivided using the PAV Optimizer described, for example, in U.S. patent application Ser. No. 14/674,617, filed Mar. 31, 2015, (now U.S. Pat. No. 9,990,137), entitled I/O Optimization," incorporated by reference herein in its entirety. For example, I/O operations for relatively large amounts of data are optionally subdivided into a plurality of I/O operations, each for a subset of the data. Each of the plurality of I/O operations may then be executed in parallel. If multiple parallel pathways exist between the host and the target device, the plurality of I/O operations may be more efficient (complete faster) than a single I/O operation for all of the data at the same time. The PAV Optimizer system relies on parallel pathways between the host and an I/O target device, which could either be a local storage device like the storage device 160 shown in FIG. 1, or could be a remote storage device. The I/O operations may be subdivided in a way that does not adversely impact or require modifications of any applications running on the host 110.

Figure 6:
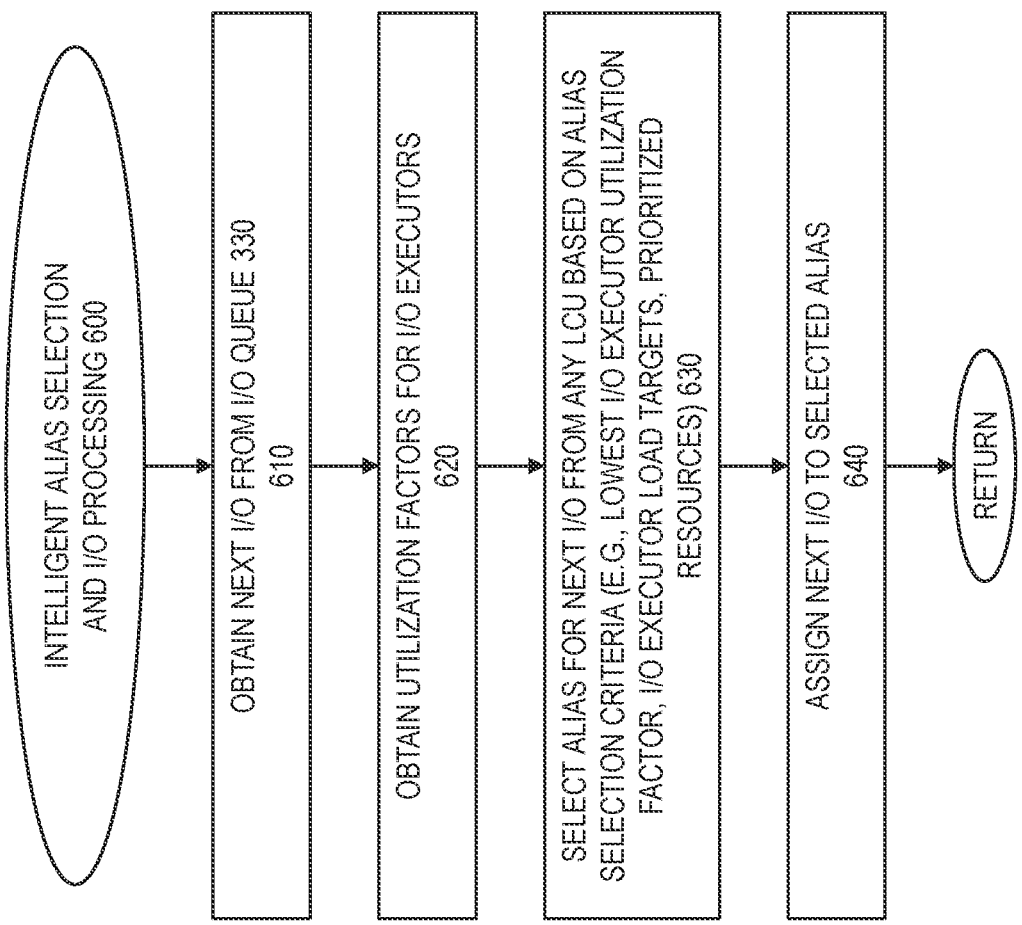
FIG. 6 is a flow chart illustrating an exemplary implementation of an Intelligent Alias Selection and I/O Processing process, according to one embodiment of the disclosure.

The set of resulting I/O operations, potentially following a subdivision, are generated during step 430. It is noted that if an I/O operation is not subdivided during step 420, then the set of resulting I/O operations will typically include one I/O operation. An Intelligent Alias Selection and I/O Processing Process 600, as discussed further below in conjunction with FIG. 6, is executed during step 440 to process the next I/O operation in the set. In an embodiment herein, performance monitoring of I/O operations is used in connection with assigning I/O operations to alias devices based on utilization of the I/O executors 230.

A test is performed during step 450 to determine if there are additional operations to process in the set of resulting I/O operations. If it is determined that there are additional operations to process in the set of resulting I/O operations, then program control returns to step 440 and continues in the manner described above. If, however, it is determined that there are no additional operations to process in the set of resulting I/O operations, and program control terminates.

It is noted that in some embodiments I/O completion is an interrupt given by the controller at the end of I/O processing. In one or more embodiments, the performance monitoring initiated during step 410 gathers the I/O response times as a collected metric, which is measured at the I/O completion in this interrupt process.

Figure 5:
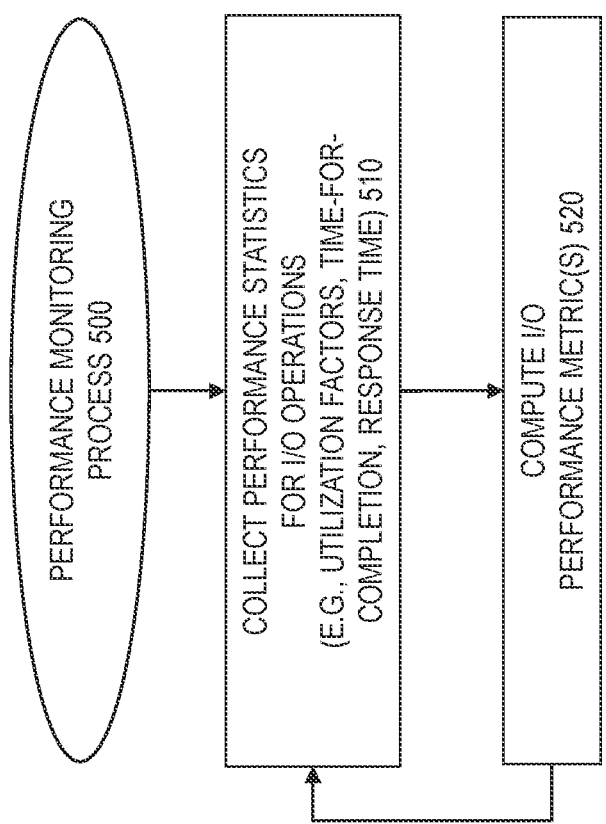
FIG. 5 is a flow chart illustrating an exemplary implementation of a Performance Monitoring Process, according to an embodiment of the disclosure.

FIG. 5 is a flow chart illustrating an exemplary implementation of a Performance Monitoring Process 500, according to one embodiment of the disclosure. As shown in FIG. 5, the exemplary Performance Monitoring Process 500 initially collects performance statistics for I/O operations (e.g., utilization factors, time-for-completion and response time) during step 510. It is noted that in various embodiments, the performance statistics can be collected using one or more of I/O sampling, I/O monitoring, polling of I/O executors 230, LCUs 300 and/or UCBs 320, status broadcast by I/O executors 230, LCUs 300 and/or UCBs 320; and/or feedback techniques. In one or more embodiments, the polling and/or status broadcast of the I/O executors 230, LCUs 300 and/or UCBs 320, may indicate that the respective device is busy or overloaded and needs to receive fewer I/O requests.

In some embodiments, the status broadcast is implemented using an attention type process, where the controller sends a message to the host to indicate that "something has changed" or the I/O executor 230 is overloaded. The host then queries the controller to see what has changed. The host will be aware of the I/O executor configuration and the host will use these status broadcasts as a way for the controller to indicate that an LCU to I/O executor mapping has changed.

Thereafter, one or more I/O performance metric(s) are computed during step 520, such as efficiency metrics, before program control terminates. The exemplary performance statistics collected during step 510 and I/O performance metric(s) computed during step 520 are utilized by the exemplary Intelligent Alias Selection and I/O Processing process 600 of FIG. 6 to intelligently assign I/O requests to alias devices 340 based on the utilization of the I/O executors 230.

For example, one or more embodiments of the disclosure select alias devices 340 to process I/O requests based on a relative utilization of I/O executors 230. Thus, the statistics collected during step 510 include (i) usage metrics for each I/O executor 230, such as a number of I/O requests processed per unit time, a number of I/O requests queued at a given time, optionally separately maintained for different classes of I/O (e.g., predefined importance and/or predefined quality levels); (ii) deviations-per-I/O executor 230 from a target IOE utilization; (iii) I/O processing time, such as time-for-completion and/or I/O response time; (iv) alias usage for each I/O; (v) number of starvation events when no alias devices were available for selection for a number of consecutive I/O; and (vi) number of I/O executors 230 having a utilization below desired target levels. For example, the predefined importance can be determined based on whether the I/O request is associated with online or batch processing.

The exemplary Performance Monitoring Process 500 can optionally employ a feedback loop to monitor the alias consumption by the Intelligent Alias Selection and I/O Processing process 600 of FIG. 6 and adjust the alias selection activity accordingly so as to not impact overall I/O throughput at the system and/or LCU level.

In various embodiments, the I/O performance metric(s) computed during step 520 can include a measured amount of performance improvement for previous cross-LCU alias assignments 360. For example, if the performance monitoring determines that the cross-LCU alias assignments 360 are generally resulting in less efficient I/O throughput (i.e., I/O operations are taking longer), then subsequent I/O operations are less likely to employ cross-LCU alias assignments 360.

In some embodiments, the I/O performance metric(s) computed during step 520 can be based on comparing feedback from I/O requests assigned to alias devices 340 within the same LCU, using HyperPAV techniques, and I/O requests processed using cross-LCU alias assignments 360.

FIG. 6 is a flow chart illustrating an exemplary implementation of an Intelligent Alias Selection and I/O Processing process 600, according to one embodiment of the disclosure. As shown in FIG. 6, the exemplary process 600 initially obtains a next I/O from the I/O queue 330 during step 610; and obtains utilization factors for the available I/O executors 230 during step 620.

An alias device 340 is selected during step 630 for the next I/O from any available LCU 300 based on predefined alias selection criteria related to the utilization of the I/O executors 230 (e.g., lowest I/O executor utilization factor, I/O executor load targets, or prioritized resources). The next I/O is then assigned to the selected alias device 340 during step 640, before program control returns to the PAV Optimization Process 400 of FIG. 4.

For example, in various embodiments, an I/O request can be assigned to an I/O executor 230 by assigning the I/O request (i) to an alias device associated with an I/O executor having a utilization factor below a predefined threshold, (ii) to balance the utilization factors of the I/O executors 230; (iii) based on a prioritization of one or more of available hardware resources and data resources; (iv) such that a predefined load target is maintained for hardware resources and/or logical components; and (v) such that a predefined resource capacity is preserved for one or more available hardware resources.

It is again noted that an I/O request can be assigned to an I/O executor 230 that is different than an I/O executor 230 associated with the I/O queue 330 from which the I/O request is being assigned.

It is further noted that an I/O request may be eligible for performance throttling based, at least in part, on the associated importance level for performing the received I/O request and one or more characteristics of the received I/O request. For example, the usage condition for allocating an alias device 340 to perform an I/O request may include: if an importance level for the I/O request is 1 and 90% or less of alias devices 340-*i* in the corresponding pool 340 of alias devices are in use; if an importance level for the I/O request is 2 and 80% or less of alias devices 340-*i* in the corresponding pool 340 of alias devices are in use; if an importance level for the I/O request is 3 and 70% or less of alias devices 340-*i* in the corresponding pool 340 of alias devices are in use; if an importance level for the I/O request is 4 and 60% or less of alias devices 340-*i* in the corresponding pool 340 of alias devices are in use; and if an importance level for the I/O request is 5 and 50% or less of alias devices 340-*i* in the corresponding pool 340 of alias devices are in use. In another embodiment, the usage condition may be variable depending on whether one or more particular importance levels for I/O requests are missing, meeting, or exceeding their respective performance goals.

CONCLUSION

One or more embodiments of the disclosure provide methods and apparatus for assigning alias devices in a parallel access volume storage environment. The foregoing applications and associated embodiments should be considered as illustrative only, and numerous other embodiments can be configured using the techniques disclosed herein, in a wide variety of different applications.

It should also be understood that the disclosed techniques for assigning alias devices, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for assigning alias devices may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as I/O manager 130, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of an alias device assignment platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the alias device assignment devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
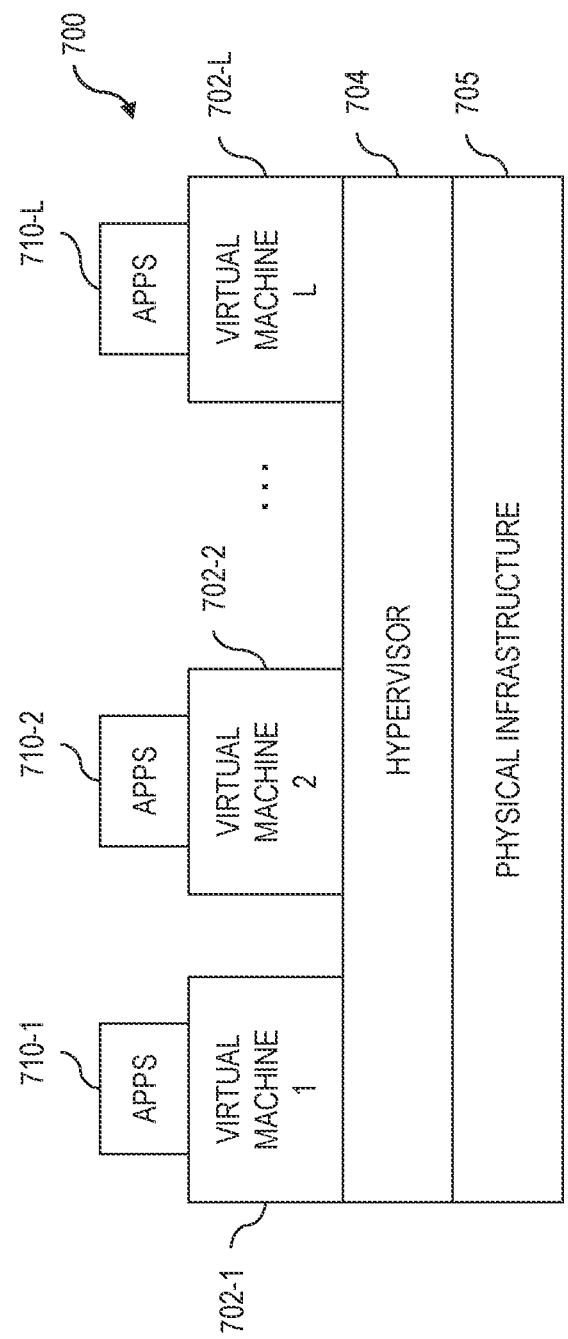
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the alias device assignment engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed alias device assignment engine apparatus may each run on a computer, server, storage device or other processing platform element. A given such element may be viewed as an example of what is more generally referred to herein as a "processing device." The cloud infrastructure 700 shown in FIG. 7 may represent at least a portion of one processing platform.

Figure 8:
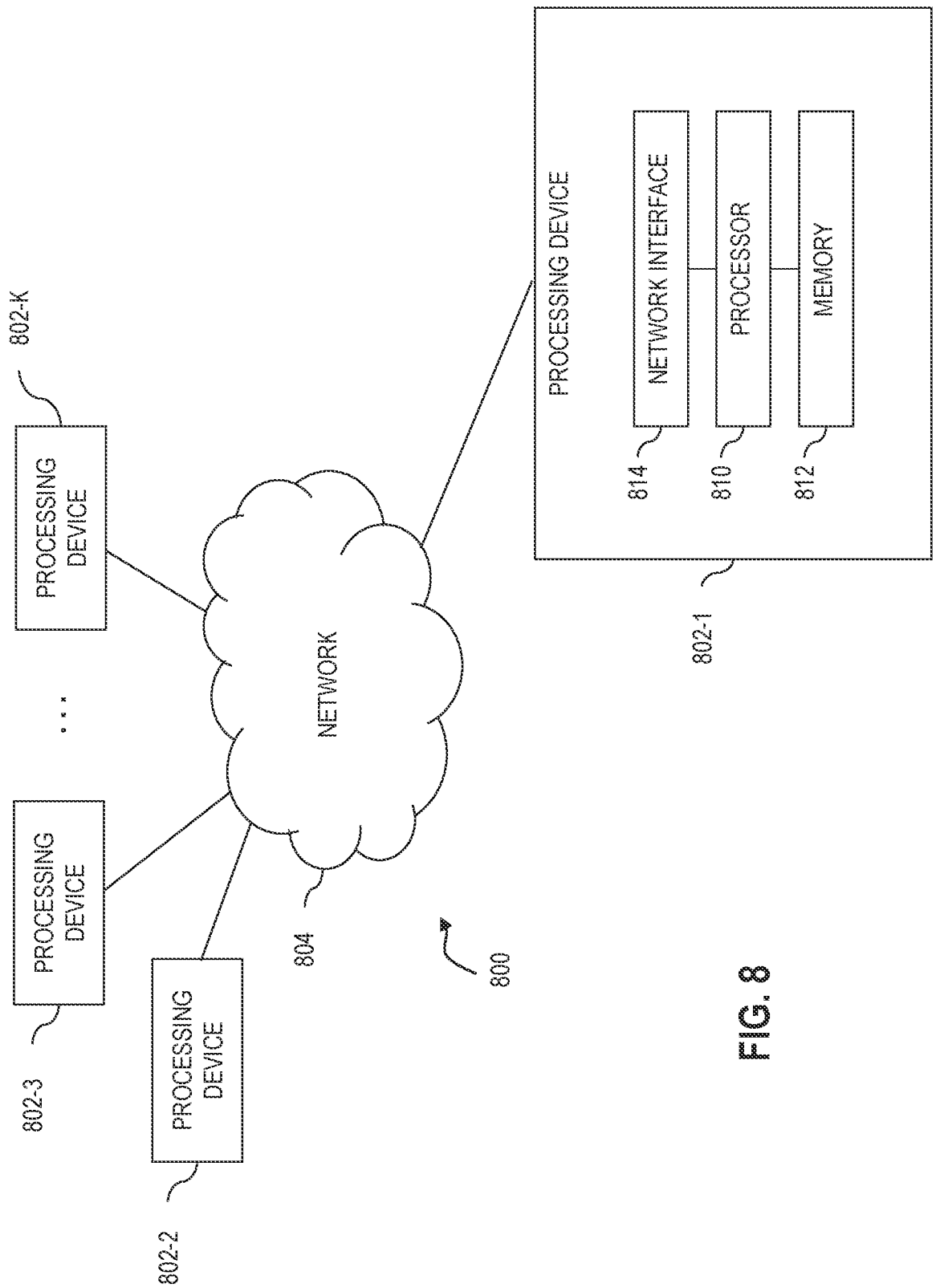
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 1-4 and 6 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for assigning alias devices by a host in a parallel access volume storage environment, comprising:
converting an original I/O (input/output) operation of the parallel access volume storage environment into a plurality of subdivided I/O operations, wherein the parallel access volume storage environment comprises a plurality of logical control units, each logical control unit comprising (i) at least one base device comprising an I/O queue, and (ii) a plurality of alias devices;
obtaining, by at least one processing device, a given one of the subdivided I/O operations from a first I/O queue corresponding to a first one of the plurality of logical control units of the parallel access volume storage environment;
obtaining, by the at least one processing device, (i) a utilization factor for each of a plurality of available I/O processing threads in a storage controller and (ii) a performance measurement associated with one or more previous I/O operations of the parallel access volume storage environment; and
assigning, by the at least one processing device based on the utilization factors and the performance measurement, the given one of the subdivided I/O operations to one of the alias devices of a second one of the logical control units of the parallel access volume storage environment that corresponds to a given one of the plurality of available I/O processing threads, wherein at least one of the other subdivided I/O operations from the first I/O queue is assigned to one of the alias devices of the first logical control unit that corresponds to another one of the plurality of available I/O processing threads.

2. The method of claim 1, wherein the given one of the subdivided I/O operations is assigned to the one of the alias devices associated with an I/O processing thread having a lowest utilization factor.

3. The method of claim 1, wherein the given one of the subdivided I/O operations is assigned to the one of the alias devices associated with an I/O processing thread having a utilization factor below a predefined threshold.

4. The method of claim 1, wherein the given one of the subdivided I/O operations is assigned to the one of the alias devices to balance the utilization factors for the plurality of available I/O processing threads.

5. The method of claim 1, wherein the second logical control unit of the parallel access volume storage environment is associated with a second I/O queue that is different than the first I/O queue.

6. The method of claim 1, wherein the given one of the subdivided I/O operations is assigned to the one of the alias devices associated with an I/O processing thread based on a prioritization of one or more of available hardware resources and data resources.

7. The method of claim 1, wherein the given one of the subdivided I/O operations is assigned to the one of the alias devices associated with an I/O processing thread such that at least one of:
a predefined load target is maintained for one or more of hardware resources and logical components; and
a predefined resource capacity is preserved for one or more available hardware resources.

8. The method of claim 1, comprising monitoring a performance of an execution of I/O operations.

9. The method of claim 1, wherein the one or more previous I/O operations comprise at least one I/O operation that was assigned from an I/O queue corresponding to a given one of the plurality of logical control units to an alias device of a different one of the logical control units of the parallel access volume storage environment, and wherein the method comprises:
computing the performance measurement by monitoring an I/O throughput of the one or more previous I/O operations.

10. The method of claim 1, comprising:
executing the plurality of subdivided I/O operations in parallel.

11. A system for assigning alias devices by a host in a parallel access volume storage environment, comprising:
a memory; and
at least one processing device, coupled to the memory, operative to implement the following steps:
converting an original I/O (input/output) operation of the parallel access volume storage environment into a plurality of subdivided I/O operations, wherein the parallel access volume storage environment comprises a plurality of logical control units, each logical control unit comprising (i) at least one base device comprising an I/O queue, and (ii) a plurality of alias devices;
obtaining, by the at least one processing device, a given one of the subdivided I/O operations from a first I/O queue corresponding to a first one of the plurality of logical control units of the parallel access volume storage environment;
obtaining, by the at least one processing device, (i) utilization factor for each of a plurality of available I/O processing threads in a storage controller and (ii) a performance measurement associated with one or more previous I/O operations of the parallel access volume storage environment; and
assigning, by the at least one processing device based on the utilization factors and the performance measurement, the given one of the subdivided I/O operations to one of the alias devices of a second one of the logical control units of the parallel access volume storage environment that corresponds to a given one of the plurality of available I/O processing threads, wherein at least one of the other subdivided I/O operations from the first I/O queue is assigned to one of the alias devices of the first logical control unit that corresponds to another one of the plurality of available I/O processing threads.

12. The system of claim 11, wherein the given one of the subdivided I/O operations is assigned to the one of the alias devices associated with an I/O processing thread having a lowest utilization factor.

13. The system of claim 11, wherein the given one of the subdivided I/O operations is assigned to the one of the alias devices associated with an I/O processing thread having a utilization factor below a predefined threshold.

14. The system of claim 11, wherein the given one of the subdivided I/O operations is assigned to the one of the alias devices to balance the utilization factors for the plurality of available I/O processing threads.

15. The system of claim 11, wherein the second logical control unit of the parallel access volume storage environment is associated with a second I/O queue that is different than the first I/O queue.

16. The system of claim 11, wherein the given one of the subdivided I/O operations is assigned to the one of the alias devices associated with an I/O processing thread based on a prioritization of one or more of available hardware resources and data resources.

17. The system of claim 11, wherein the given one of the subdivided I/O operations is assigned to the one of the alias devices associated with an I/O processing thread such that at least one of:
  a predefined load target is maintained for one or more of hardware resources and logical components; and
  a predefined resource capacity is preserved for one or more available hardware resources.

18. The system of claim 11, wherein the at least one processing device is operative to implement the step of monitoring a performance of an execution of I/O operations.

19. A computer program product for assigning alias devices by a host in a parallel access volume storage environment, comprising a non-transitory machine-readable storage medium having encoded therein executable code of one or more software programs, wherein the one or more software programs when executed by at least one processing device perform the following steps:
  converting an original I/O (input/output) operation of the parallel access volume storage environment into a plurality of subdivided I/O operations, wherein the parallel access volume storage environment comprises a plurality of logical control units, each logical control unit comprising (i) at least one base device comprising an I/O queue, and (ii) a plurality of alias devices;
  obtaining, by the at least one processing device, a given one of the subdivided I/O operations from a first I/O queue corresponding to a first one of the plurality of logical control units of the parallel access volume storage environment;
  obtaining, by the at least one processing device, (i) utilization factor for each of a plurality of available I/O processing threads in a storage controller and (ii) a performance measurement associated with one or more previous I/O operations of the parallel access volume storage environment; and
  assigning, by the at least one processing device based on the utilization factors and the performance measurement, the given one of the subdivided I/O operations to one of the alias devices of a second one of the logical control units of the parallel access volume storage environment that corresponds to a given one of the plurality of available I/O processing threads, wherein at least one of the other subdivided I/O operations from the first I/O queue is assigned to one of the alias devices of the first logical control unit that corresponds to another one of the plurality of available I/O processing threads.

20. The computer program product of claim 19, wherein the given one of the subdivided I/O operations is assigned to the one of the alias devices associated with an I/O processing thread having a lowest utilization factor.

* * * * *